(12) United States Patent
Filippelli

(10) Patent No.: US 7,360,429 B1
(45) Date of Patent: Apr. 22, 2008

(54) HIGH SENSITIVITY PRESSURE ACTUATED SWITCH BASED ON MEMS-FABRICATED SILICON DIAPHRAGM AND HAVING ELECTRICALLY ADJUSTABLE SWITCH POINT

(75) Inventor: Albert R. Filippelli, Boulder, CO (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 11/700,303

(22) Filed: Jan. 31, 2007

(51) Int. Cl.
*G01L 9/12* (2006.01)

(52) U.S. Cl. ............ 73/715; 200/834; 73/724; 73/718

(58) Field of Classification Search ............ 73/715, 73/724, 718; 200/83
See application file for complete search history.

(56) References Cited

U.S. PATENT DOCUMENTS

| | | | |
|---|---|---|---|
| 3,748,571 A | 7/1973 | Kurtz | |
| 3,845,260 A | 10/1974 | Lohr | |
| 4,160,139 A | 7/1979 | Johnston | |
| 5,252,792 A * | 10/1993 | Joyce | ............ 200/83 P |
| 5,323,656 A | 6/1994 | Fung et al. | |
| 5,453,628 A | 9/1995 | Hartsell et al. | |
| 5,818,002 A | 10/1998 | Kurtz et al. | |
| 5,936,164 A | 8/1999 | Sparks et al. | |
| 5,955,771 A * | 9/1999 | Kurtz et al. | ............ 257/419 |
| 6,088,214 A | 7/2000 | Malone et al. | |
| 6,346,681 B1 | 2/2002 | Joyce et al. | |
| 6,662,029 B2 | 12/2003 | Eden et al. | |
| 6,700,299 B2 | 3/2004 | Quenzer et al. | |
| 6,891,711 B1 | 5/2005 | Kurtz | |
| 7,004,034 B2 | 2/2006 | Chen | |
| 7,057,247 B2 | 6/2006 | Kurtz et al. | |
| 7,085,121 B2 | 8/2006 | Lynch et al. | |

\* cited by examiner

*Primary Examiner*—Andre J. Allen
(74) *Attorney, Agent, or Firm*—Hamilton, Brook, Smith & Reynolds, P.C.

(57) ABSTRACT

A pressure actuated switch for a pressure control region includes a diaphragm with a first electrically conductive surface and a second conductive surface electrically isolated from the first conductive surface. The switch also includes an evacuated cavity disposed between the first conductive surface and the second conductive surface and includes a piezoelectric assembly on which is mounted the second conductive surface. A controller applies a control signal to the piezoelectric assembly. The piezoelectric assembly in response to the control signal translates the second conductive surface to set a trip point of the switch. The diaphragm is exposed to the pressure of the pressure control region. In response to the pressure applied to the first conductive surface, the first conductive surface deflects in a direction toward the second conductive surface. The first conductive surface communicates with the second conductive surface to produce a signal when the applied pressure is sufficiently large.

21 Claims, 14 Drawing Sheets

HIGH SENSITIVITY PRESSURE ACTUATED SWITCH BASED ON MEMS-FABRICATED SILICON DIAPHRAGM AND HAVING ELECTRICALLY ADJUSTABLE SWITCH POINT

BACKGROUND OF THE INVENTION

Flexure of a thin diaphragm as a result of a difference in pressure applied to the two sides of the diaphragm is the basis for some existing pressure transducers. In some versions, the magnitude of the flexure is sensed by a strain gauge network attached to the diaphragm. In another version, the flexure is detected as a change in the capacitance between one side of the (electrically-conductive) diaphragm surface and some conductive portion of the surface of an adjacent fixed electrode. With the existing state of the art for metal diaphragm versions of capacitance diaphragm pressure gauges, pressure differences as small as $1 \times 10^{-7}$ Torr can be detected and measured. Thus, except for pressures below about $1 \times 10^{-7}$ Torr, pressure measurement tasks in the semiconductor processing industry can be accomplished with capacitance diaphragm pressure gauges. This capability includes the ability of the capacitance diaphragm pressure gauge to perform a switching action when the measured pressure exceeds or falls below a preset value.

On the other hand, if a switching function is all that is required, a capacitance diaphragm pressure gauge is an expensive solution. Also, if several such independently functioning switches are needed on the same semiconductor processing tool in which space is very limited, there just may not be enough space available. Thus, from the standpoint of both cost and size, a compact, relatively inexpensive pressure actuated switch which can operate at a settable pressure anywhere in the range $1 \times 10^{-6}$ Torr and above would be advantageous to the semiconductor processing industry. Accordingly, there is a need in the art for such a pressure sensing device that overcomes these deficiencies in the art.

SUMMARY OF THE INVENTION

According to a first embodiment of the present disclosure, there is provided a pressure actuated switch for a pressure region. The switch has an elastic diaphragm including a first electrically conductive surface. The switch also has a second conductive surface electrically isolated from the first conductive surface and having an evacuated cavity disposed between the first conductive surface and the second conductive surface. The switch also has a piezoelectric assembly coupled to the second conductive surface, with the piezoelectric assembly coupled to a controller.

The controller applies a control signal to the piezoelectric assembly, and in response the piezoelectric assembly shifts the location of the second conductive surface in such a way that the minimum separation between first and second surfaces is reduced, and thus the applied pressure on the first surface required to make it contact the second surface is reduced. In this way, a trip point of the switch is set. The diaphragm is exposed to the pressure region, and in response to a sufficient pressure, the first conductive surface deflects in a direction toward the second conductive surface. The first conductive surface communicates with the second conductive surface to produce a signal. Conversely, as the applied pressure, initially higher than the trip point pressure becomes less than the trip point pressure, the contact between the first and the second surfaces is interrupted.

The diaphragm may, for example, be doped with a second material to make it electrically conductive. The diaphragm may also be a single crystal silicon diaphragm. The diaphragm is elastic. In a further embodiment, the diaphragm may be a micro-electro-mechanical system that is fabricated as a boron doped single crystal silicon diaphragm. The elastic diaphragm may also be an insulating material such as poly silicon on which a metallic film has been deposited. The elastic diaphragm may also be entirely metal.

The evacuated cavity that is disposed between the first conductive surface and the second conductive surface may include a gap distance of about three micrometers.

The produced signal may have a predetermined current that is sufficiently low so as to not damage the first switch contact and the second switch contact.

The piezoelectric assembly may contact a substrate of the second conductive surface at substantially a center or at a midpoint of the substrate of the second conductive surface. In another embodiment, the switch may further include an electrode that is connected to the second conductive surface and the piezoelectric assembly may move the second conductive surface. The diaphragm, for example, can have a thickness of about three micrometers.

The shape or location of the second surface is set only by the force or movement of the actuator, and this shape is not affected by the pressure applied to the first surface. To approximate this condition in which the shape of the first surface does not affect the shape of the second surface, the cavity is evacuated and the side and bottom of the cavity are thick so they do not distort under the applied pressure.

At a sufficient pressure, the first conductive surface contacts the second conductive surface. The pressure actuated switch may include contact corresponding to pressure in a range of between about 1 Torr to about $1 \times 10^{-7}$ Torr. The switch may further comprise an amplifier that is configured to amplify the received signal.

The pressure actuated switch may further include a coating that is disposed on the pressure facing side of the diaphragm. The coating may be configured to protect the diagram. The second conductive surface can be an electrode. A control signal applied to the piezoelectric assembly causes the piezoelectric actuator to change the shape and/or location of the second surface and set the trip point of the switch.

According to another embodiment of the present disclosure, there is provided a pressure actuated switch for a process control pressure region. The switch may include a boron doped single crystal silicon diaphragm. The diaphragm may have a first electrically conductive surface. The diaphragm is also exposed to an applied pressure in the process control region. The switch also may have a second conductive surface that is electrically isolated from the first conductive surface. The switch has an evacuated cavity disposed between the first conductive surface and the second conductive surface.

The pressure actuated switch may also have a piezoelectric assembly. The piezoelectric assembly is mechanically coupled to the second conductive surface. The piezoelectric assembly is coupled to a controller and is configured to shift the second conductive surface to adjust a trip point of the pressure actuated switch by changing the gap distance between the first and the second conductive surfaces. The switch also has the controller applying a control signal to the piezoelectric assembly. In response to the control signal the piezoelectric assembly shifts the second conductive surface to set the trip point. The first conductive surface deflects in a direction toward the second conductive surface in response to the applied pressure. For a sufficiently large pressure on the diaphragm, the first conductive surface contacts the second conductive surface in response to the applied pressure to produce a signal. The trip point is settable in a range that includes 1 Torr to $1\times10^{-7}$ Torr and any intermediate ranges therebetween.

According to another embodiment of the present disclosure, there is provided a pressure actuated switch for a process control region comprising a coated conductive diaphragm. The pressure actuated switch may have a conductive surface electrically isolated from the coated conductive diaphragm and also an evacuated cavity. The cavity may be disposed between the coated conductive diaphragm and the conductive surface. The switch may also include a piezoelectric assembly. The assembly may mechanically contact or otherwise be mechanically coupled to the second conductive surface. The piezoelectric assembly may also be coupled to an actuator, or alternatively the piezoelectric assembly may be the actuator and further include a controller integrated therein. The assembly can be configured to selectively adjust a trip point of the pressure actuated switch. The controller applies a control signal to the piezoelectric assembly, and the piezoelectric assembly in response to the control signal changes the gap distance to set the trip point. The coated conductive diaphragm may deflect in a direction toward the conductive surface in response to an applied pressure. The first surface may communicate with the second surface in response to a sufficiently large applied pressure. The communication may produce a signal at the applied pressure. The trip point may be set in a number of ranges. The ranges may include 1 Torr to $1\times10^{-7}$ Torr and any intermediate ranges therebetween.

According to another embodiment of the present disclosure, there is provided a method for actuating a switch in response to an applied pressure. The method may comprise electrically setting a trip point of the switch by applying a signal to a piezoelectric actuator. The piezoelectric actuator is configured to move the second conductive surface in response to the signal. In response to the movement of the actuator, the second surface moves and the gap distance between the first and second conductive surfaces changes. This may adjust a predetermined gap between the first conductive diaphragm and the second conductive surface. The method also applies a signal to the first conductive diaphragm and to the second conductive surface. The method then exposes the first conductive diaphragm to the applied pressure. In response to a sufficient pressure, the method can develop a signal when the applied pressure exceeds a predetermined pressure threshold. The predetermined pressure threshold can be when the first conductive diaphragm contacts the second conductive surface.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

The present disclosure is directed to a pressure actuated switch 100 that includes one or more Micro-electro-mechanical Systems ("MEMS") components that have a size in the order of one to a few thousand micrometers, or a thousandth of a meter. The pressure actuated switch 100 can preferably toggle or trip from one state to another upon detecting very small pressures in the order of 1 to $1\times10^{-7}$ Torr and is useful in high vacuum environments. Preferably, the pressure actuated switch 100 is reusable and can also be operatively connected to a controller and has the ability to selectively change the trip point from a first pressure trip point to another second pressure trip point. For example, the pressure actuated switch 100 can be set to a first trip point of $1\times10^{-3}$ Torr. Thereafter, after a period of time, the pressure actuated switch 100 can be changed from tripping or detecting a pressure of $1\times10^{-3}$ Torr to a smaller pressure in a region such as $1\times10^{-7}$ Torr. The pressure actuated switch 100 is configured to output a signal when the pressure in a region reaches a limit. The limit may be very small, on the order of $1\times10^{-3}$ Torr, $1\times10^{-7}$ Torr, or another example.

Figure 1A:
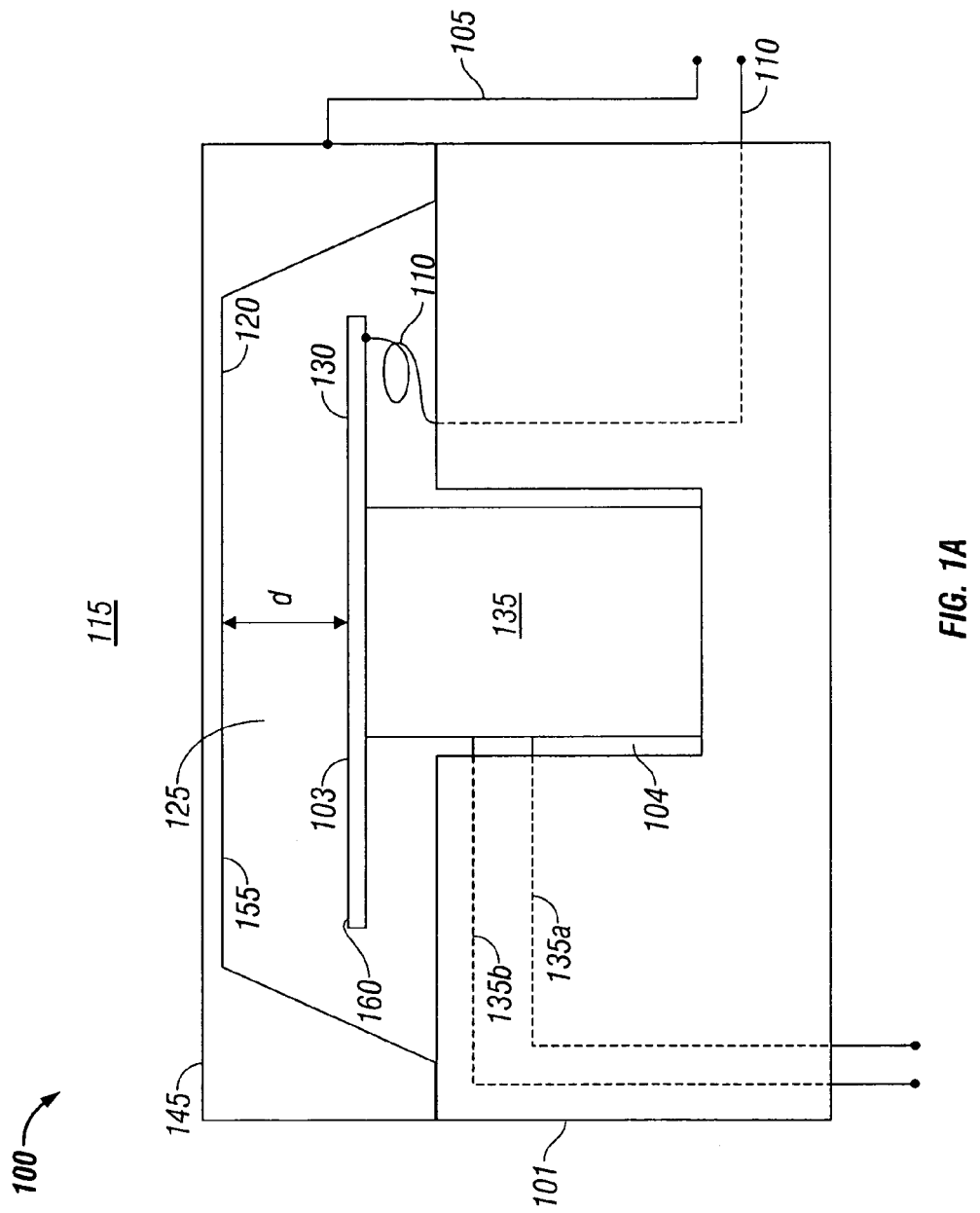
FIG. 1A is a cross sectional view of the pressure actuated switch according to the present invention.

Referring now to FIG. 1A, there is shown a pressure actuated switch according to the present disclosure. As shown in FIG. 1A, the switch 100 includes a programmable trip point feature. The programmable trip point may set the trip point of the switch 100 to different trip points over the course of usage, such as, from $1 \times 10^{-3}$ Torr to $1 \times 10^{-7}$ Torr and is highly sensitive to pressure in a high vacuum region or ultra high vacuum region. Advantageously, the pressure actuated switch 100 can be used for process controls in semiconductor fabrication processes and does not necessarily need to calculate or otherwise determine a pressure of the region, but instead simply can be toggled from a first state to a second state based on a pressure and then output a signal.

FIG. 1A shows a first embodiment of the pressure actuated switch according to the present disclosure. FIG. 1A shows the pressure actuated switch 100 in a sectioned view. As is understood, the pressure actuated switch 100 can be connected or attached to a process module, a cluster tool, a load lock for a semiconductor manufacturing component, or any other high vacuum environment, for diagnostic or control purposes. Alternatively, the pressure actuated switch 100 may be used in an avionics environment or may be placed on a substrate and be operatively connected to an integrated circuit. In a preferred embodiment, the switch 100 produces a signal based on pressure in the high vacuum environment.

The pressure actuated switch 100 includes a first electrical contact 120 connected to lead 105 and a second electrical contact 130 connected to lead 110. The first electrical contact 120 connected to lead 105 and the second electrical contact 130 connected to lead 110 are made from a conductive material. The contacts 120, and 130 are placed a predetermined distance apart from one another such that upon a pressure sufficient enough in region 115, the first electrical contact 120 communicates with the second electrical contact 130 or, diaphragm 120 contacts a conductive surface 103. This communication permits current to traverse from the first electrical contact 120 to the second electrical contact 130 and a signal to be produced therefrom.

One significant aspect of the first electrical contact 120 and lead 105 and the second electrical contact 130 and lead 110 is that they are made of very small MEMS technology components with dimensions in the range of a few micrometers to a few thousand micrometers, and only a very small amount of current is communicated through the first electrical contact 120 to the second electrical contact 130 so as not to damage the first electrical contact 120 or lead 105 and the second electrical contact 130 or lead 110.

The pressure actuated switch 100 includes a diaphragm 120, a permanently evacuated cavity 125, and a substrate 101. The substrate 101 is preferably a ceramic material or any other suitable electrically insulating material such as glass that is connected to the diaphragm 120 as shown in FIG. 1A such that the diaphragm 120 may elastically move while being connected to the substrate 101 yet maintain the cavity 125 sealed. The diaphragm 120 is preferably circular shaped, but may have other shapes. The diaphragm 120, the permanently evacuated cavity 125, and the substrate 101 may be further connected to a support structure (not shown).

Disposed in the permanently evacuated cavity 125 is a second conductive surface 103. The second conductive surface 103, together with the electrical lead or wire 110 connected to it, forms the second electrical contact 130. The second conductive surface 103 is disposed apart from the diaphragm 120, or first conductive surface by a predetermined gap d. In one non-limiting embodiment, the predetermined gap d is about 3 micrometers with the permanently evacuated cavity 125 being disposed therebetween.

The pressure actuated switch 100 further includes a voltage driven piezoelectric actuator 135. The second conductive surface 103 is attached to, and moved by, the actuator 135. The piezoelectric actuator 135 is disposed through the substrate 101 through notch 104. The piezoelectric actuator 135 is positioned directly under the diaphragm 120. The electrically driven piezoelectric actuator 135 may set the pressure actuated switch 100 to a trip point. The trip point is a predetermined pressure value in region 115 at which the first electrical contact 120 will communicate with the second electrical contact 130 in order to produce a signal therefrom. The voltage driven piezoelectric actuator 135 is disposed underneath the second conductive surface 103 and both rest on substrate 101 with the substrate 101 resting on a support plate (not shown). Various support connection configurations are possible and within the scope of the present disclosure. It should be further appreciated that the diaphragm 120 responds in a continuous way or manner to the pressure on the diaphragm 120 as the diaphragm 120 is made from an elastic material.

As shown, the pressure actuated switch 100 includes the diaphragm 120 which is disposed opposite the electrically driven piezoelectric actuator 135. The diaphragm 120 includes a first face 145 that is in contact with the region 115 and an opposite second face 155 that is in contact with the permanently evacuated cavity 125.

In one embodiment, the diaphragm 120 is configured to be electrically conductive. In another embodiment, the diaphragm 120 is a single crystal silicon diaphragm that is doped with a material to make it electrically conductive. In yet another preferred embodiment, the diaphragm 120 is a boron doped single crystal silicon diaphragm made by INTEGRATED SENSING SYSTEMS, INC. of Ypsilanti, Mich. However, it should be appreciated that the diaphragm 120 can be fashioned with any elastic material that includes another material that has sufficiently good electrically conductive properties. In still another embodiment, the diaphragm 120 may be a boron doped single crystal silicon diaphragm that is coated with a protective coating. The coating preferably prevents the diaphragm 120 from reacting with gaseous substances disposed in the region 115. It should be appreciated that in one embodiment, the boron-doped-single crystal silicon diaphragm 120 has a diameter of about 4 mm, and a thickness of about 3 micrometers; however the boron doped single crystal silicon diaphragm 120 may be fashioned in many different sizes and thicknesses depending on the intended usage.

The permanently evacuated cavity 125 shown in FIG. 1A is sealed by a bond between the rim of the diaphragm 120 and the substrate 101 or alternatively another sealing structure that seals and prevents any gaseous substances from entering the permanently evacuated cavity 125. In one embodiment, the second conductive surface 103 may include a plate or disk shaped electrode 160 that is supported on the piezoelectric actuator 135. In an alternative embodiment, the conductive surface 103 may not include an electrode and instead include a conductive film 160. Film 160 can be supported on a plate that is connected to the piezoelectric actuator 135. In this embodiment, the electrode/conductive film 160 is a metallic film or has metallic particles. The conductive film/electrode 160 preferably faces the diaphragm 120 such that when a predetermined pressure F is applied to the diaphragm 120 from the region 115, the diaphragm 120 will deflect or deform in a direction toward the conductive surface 103 and the second face 155 will contact the electrode/conductive film 160 on the second conductive surface 103. The electrical current from lead 105 will traverse through the diaphragm 120 and to the conductive surface 103 by way of the electrode 160 and through second lead 110 to complete the circuit. This signal can be communicated to an indicator (not shown) or communicated to a controller (not shown) to provide an indication that the applied pressure in region 115 exceeds a predetermined pressure threshold.

Figure 1B:
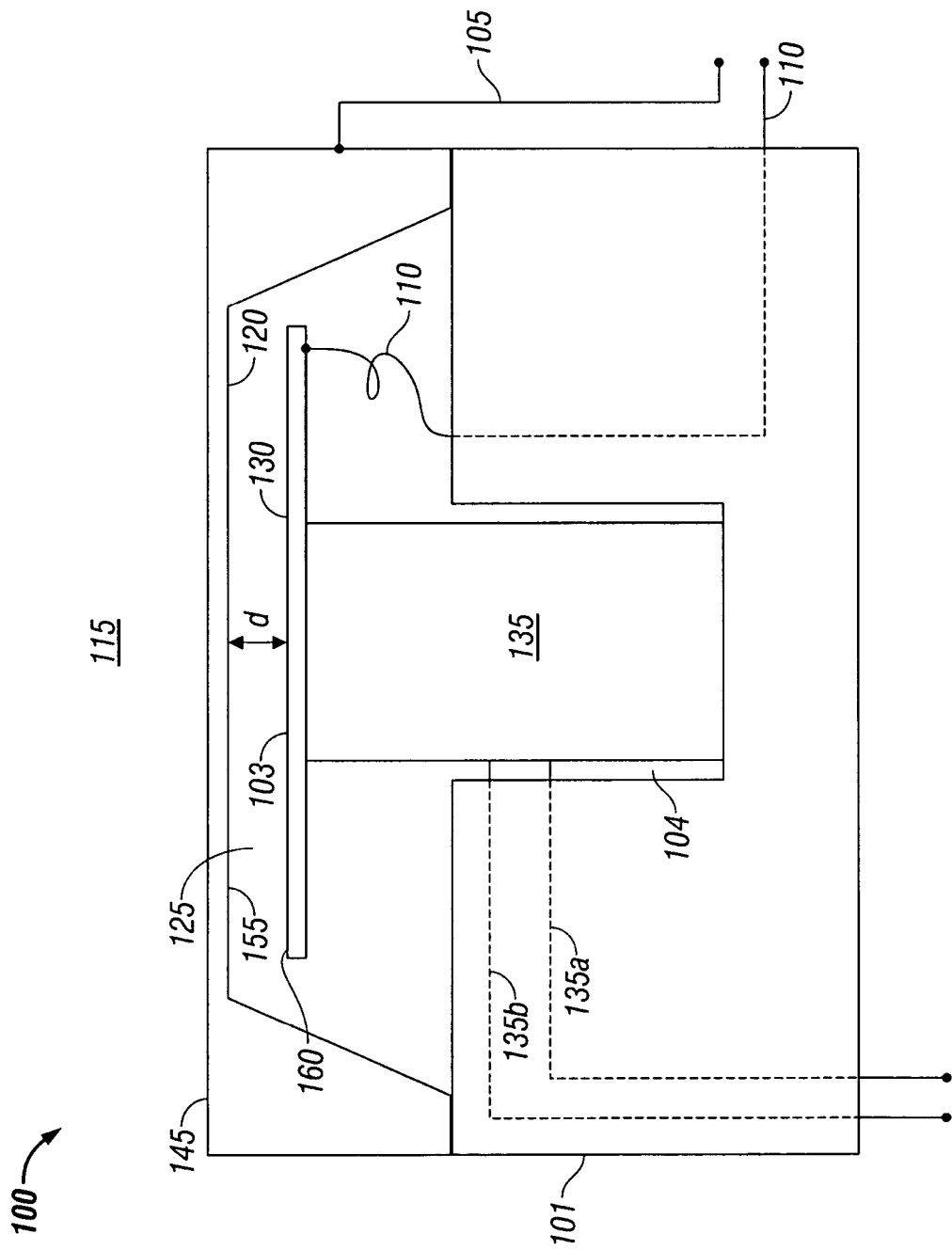
FIG. 1B is a cross sectional view of the pressure actuated switch of FIG. 1A showing a piezoelectric actuator advancing a conductive surface relative to a diaphragm to set a gap between the conductive surface and the diaphragm.

Turning now to FIG. 1B, the pressure actuated switch 100 also includes the piezoelectric actuator 135 that is in contact with the second conductive surface 103 which is configured to move vertically to reduce or enlarge the predetermined gap d in an electronic manner. In one embodiment, the piezoelectric actuator 135 includes a plate or disk to support the second conductive surface 103 on an end of the actuator 135 as shown. However this arrangement is not limiting and the piezoelectric actuator 135 may be formed without the disk or plate. Instead, the switch 100 may have the conductive surface, film or electrode 160 formed directly on, or integrated with the piezoelectric actuator 135. Various configurations are possible and within the scope of the present disclosure.

The piezoelectric actuator 135 is preferably an electric-field controlled device and includes a ceramic material. Once a voltage is applied to the piezoelectric actuator 135 along leads 135a and 135b through the substrate 101, the applied voltage causes a length of the piezoelectric actuator 135 to increase in proportion to the applied voltage. The increase in length, thus, translates or otherwise moves the second conductive surface 103 above the substrate 101 and closer to the diaphragm 120. As the applied voltage is reduced or removed, the piezoelectric actuator 135 will reduce its length. Here, the piezoelectric actuator 135 moves vertically in the opposite direction and the second conductive surface 103 will move further from the diaphragm 120 to increase the gap distance d (FIG. 1A). In other words, the piezoelectric actuator 135 sets the predetermined gap d between the diaphragm 120 and the conductive surface 103.

This can be done in an electronic manner which is advantageous. The pressure actuated switch 100 includes the piezoelectric actuator 135 that preferably sets the trip point of the pressure actuated switch 100 simply by applying a voltage. In one embodiment, an applied voltage or signal is applied to the piezoelectric actuator 135 of the pressure actuated switch 100 in order to set the trip point of the switch 100 by translating the conductive surface 103 in a direction toward or away from the diaphragm 120 using a controller (not shown). In one embodiment, the trip point may be set at 1 Torr to $1 \times 10^{-7}$ Torr, or another range. However, various different gap distances d may be selected to set the conductive surface 103 a predetermined distance from the diaphragm 120.

Figure 2A:
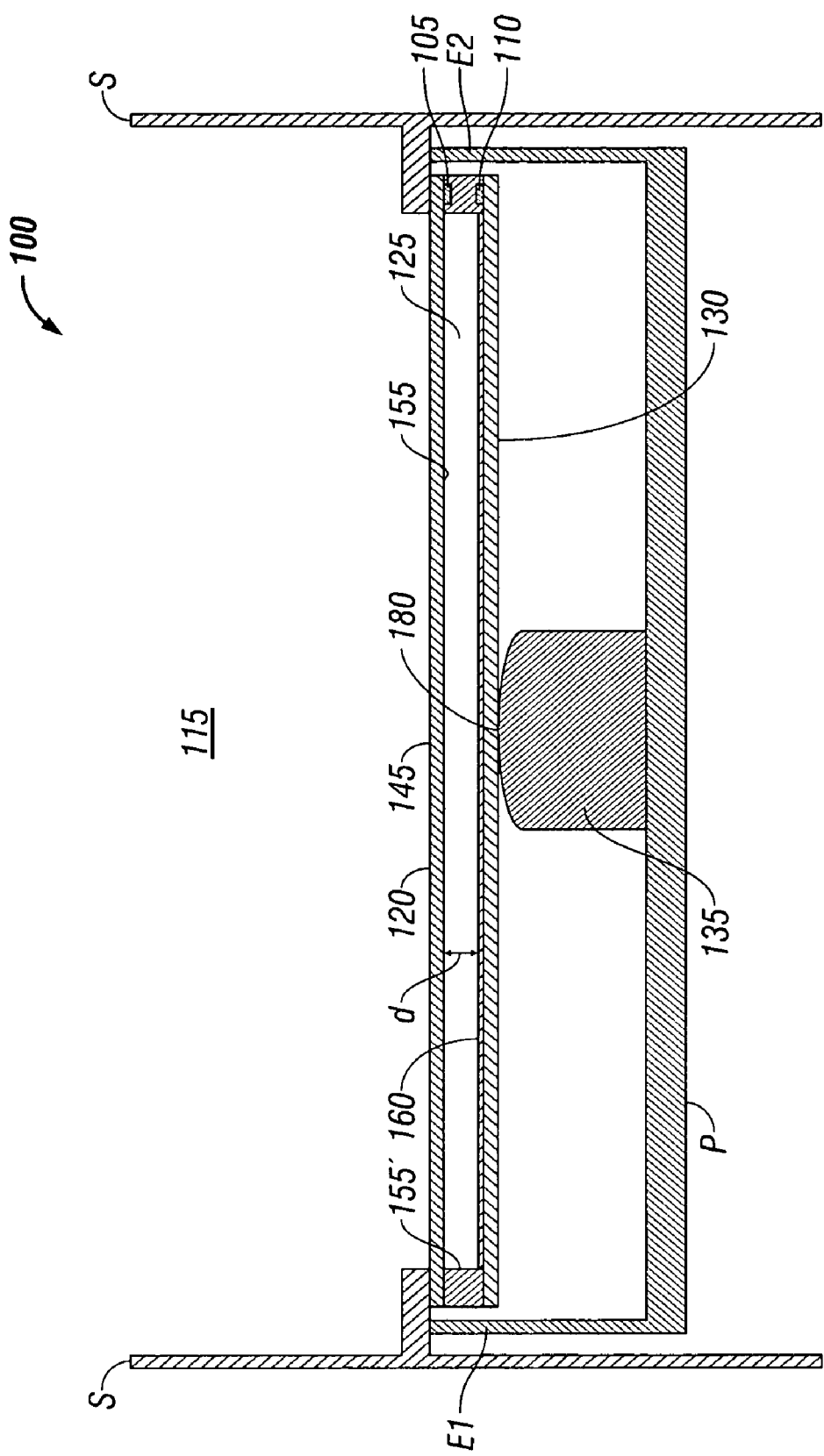
FIG. 2A is a cross sectional view of another alternative pressure actuated switch according to the present invention.

FIG. 2A shows another embodiment of the pressure actuated switch 100 in a sectioned view. As is understood, the pressure actuated switch 100 can be connected or attached to a process module, a cluster tool, a load lock for a semiconductor manufacturing component, or any other high vacuum environment, for diagnostic or measurement purposes. Alternatively, the pressure actuated switch 100 may be used in an avionics environment or may be placed on a substrate and be operatively connected to an integrated circuit. In a preferred embodiment, the switch 100 produces a signal based on pressure in the high vacuum environment.

Similarly, the pressure actuated switch 100 includes a first electrical contact 120 connected to lead 105 and a second electrical contact 130 connected to lead 110. The first electrical contact 120 connected to lead 105 and the second electrical contact 130 connected to lead 110 are made from a conductive material and placed a predetermined distance apart from one another such that upon a pressure sufficient enough in region 115, the first electrical contact 120 communicates with the second electrical contact 130 (diaphragm 120 moves enough to contact a backing plate 130). This communication permits current to traverse from the first electrical contact 120 to the second electrical contact 130 and a signal produced therefrom.

In this alternative embodiment, the pressure actuated switch 100 includes a diaphragm 120, a permanently evacuated cavity 125, and a backing plate 130 all arranged on a support structure S. The diaphragm 120 and the backing plate 130 form the first and the second electrical contacts. The diaphragm 120 is preferably circular shaped, but may have other shapes. The support structure S may have any configuration known in the art to provide support to the diaphragm 120, the permanently evacuated cavity 125, and the backing plate 130. It should be appreciated that although the support structure S is shown as comprising two parallel spaced support members, the support structure S is not limited to this configuration and may be formed as one support member or have other configurations. In one configuration, the backing plate 130 is disposed apart from the diaphragm 120 with the permanently evacuated cavity 125 being disposed between the backing plate 130 and the diaphragm 120. In one embodiment, the backing plate 130 is disposed apart from the diaphragm 120 by a predetermined gap d. In this non-limiting embodiment, the predetermined gap d is about 3 micrometers with the permanently evacuated cavity 125 being disposed therebetween.

The pressure actuated switch 100 further includes a voltage driven piezoelectric actuator 135 that is in physical contact with the backing plate 130 and under the diaphragm 120. The electrically driven piezoelectric actuator 135 may set the pressure actuated switch 100 to the trip point. In this embodiment, the voltage driven piezoelectric actuator 135 is disposed underneath the backing plate 130 and rests on a support plate P. Support plate P is connected at a first end E1 and a second end E2 to the support S. However, it is envisioned that this arrangement is not limiting and the support plate P and the support structure S may be fabricated as one member or more than one member. Various connection configurations are possible and within the scope of the present disclosure.

As shown, the pressure actuated switch 100 includes the diaphragm 120 which is disposed opposite the electrically driven piezoelectric actuator 135. The diaphragm 120 is shown in a cross sectioned view and includes a first face 145 that is in contact with the region 115 and an opposite second face 155 that is in contact with the permanently evacuated cavity 125. It should be appreciated that the diaphragm 120 can be fashioned with any elastic material that has sufficiently good electrical conductivity similar to the previously described embodiments. As an alternative to doping the diaphragm, the conductivity may be achieved through a metallic film, such as gold. The gold can be deposited on face 155 of diaphragm 120. In still another embodiment, the diaphragm 120 may be a boron doped single crystal silicon diaphragm that is coated with a protective coating as discussed previously. The coating preferably prevents the diaphragm 120 from reacting with gaseous substances disposed in the region 115. It should be appreciated that in one embodiment, the boron-doped-single crystal silicon diaphragm 120 has a diameter of about 4 mm, and a thickness of about 3 micrometers; however the boron doped single crystal silicon diaphragm 120 may be fashioned in many different diameters, sizes and thicknesses depending on the intended usage, and it should be appreciated that the diaphragm does not necessarily need to be circular shaped and may have other shapes.

The permanently evacuated cavity 125 shown in FIG. 2A may be surrounded by a ring housing 155', ring member, capsule or structure that is sealed to prevent any gaseous substances from entering the permanently evacuated cavity 125. In one embodiment, the backing plate 130 is an elastic member. The backing plate 130 includes a complementary configuration relative to the diaphragm 120. The backing plate 130 in one embodiment includes a conductive film 160. In one embodiment, the conductive film 160 is metallic film.

Figure 2B:
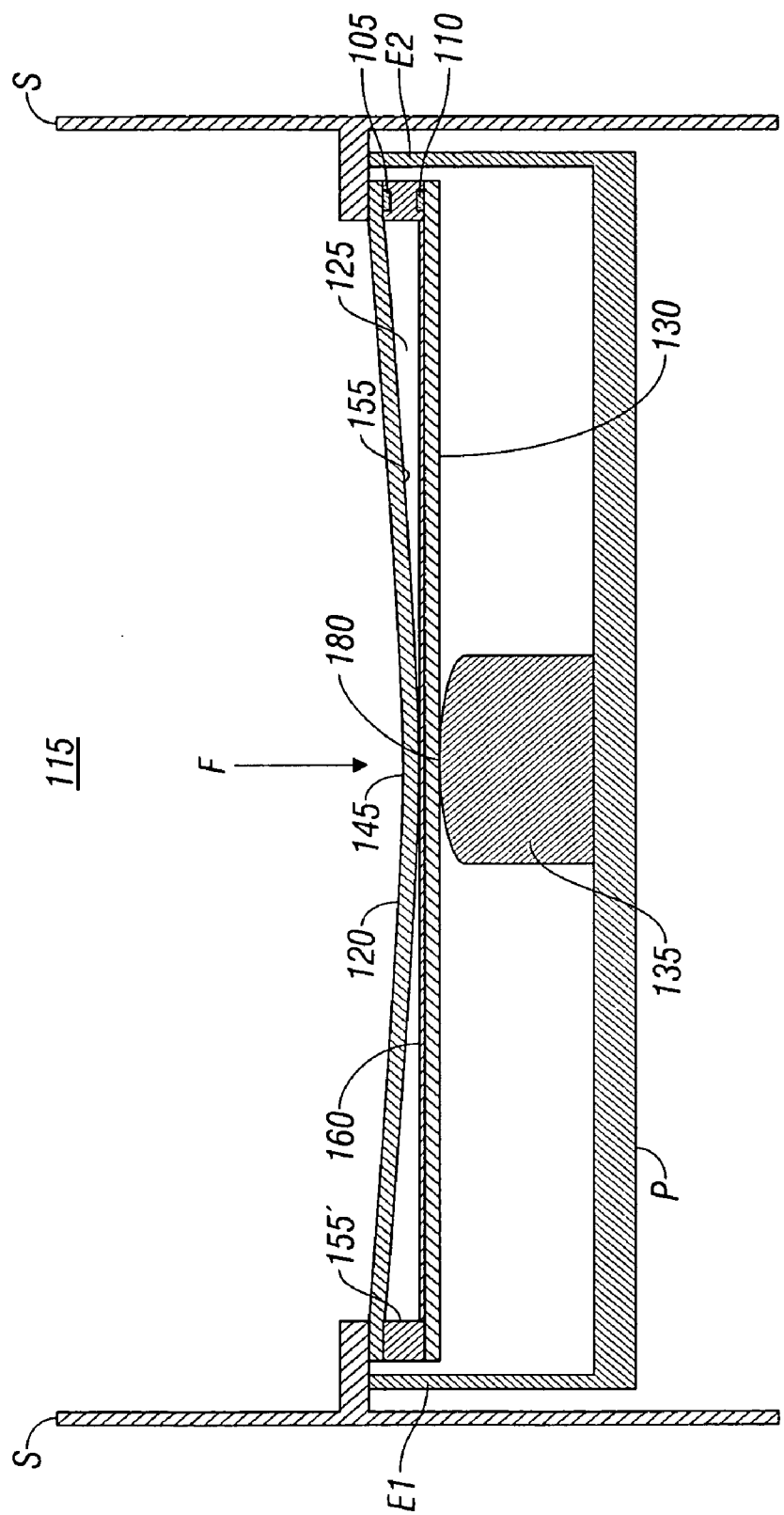
FIG. 2B is a cross sectional view of the pressure actuated switch of FIG. 2A showing a diaphragm contacting a conductive film on a backing plate to trip the switch.

The conductive film 160 preferably faces the diaphragm 120 such that when a predetermined pressure F is applied to the diaphragm 120 from the region 115, the diaphragm 120 will deflect or deform in a direction toward the backing plate 130. Here, the second face 155 will contact the conductive film 160 of the backing plate 130 as shown in FIG. 2B. The electrical current from lead 105 will traverse through the diaphragm 120 and to the backing plate 130 by way of the conductive film 160 and through second lead 110 to complete the circuit.

Similar to the previously described embodiment, the pressure actuated switch 100 also includes the piezoelectric actuator 135. However in this embodiment, the actuator 135 contacts the backing plate 130. Once a voltage is applied to the piezoelectric actuator 135, the voltage causes a length of the piezoelectric actuator 135 to increase in proportion to the applied voltage. The increase in length thus deforms or otherwise moves the backing plate 130 away from base plate P and closer to the diaphragm 120. As the applied voltage is reduced or removed, the elasticity of the backing plate 130 causes the backing plate 130 to return to its original shape and location once the length is reduced and sets the predetermined gap d between the diaphragm 120 and the backing plate 130.

The piezoelectric actuator 135 selectively sets the trip point of the pressure actuated switch 100. In one embodiment, an applied voltage or signal is applied to the piezoelectric actuator 135 of the pressure actuated switch 100 in order to set the trip point of the switch 100 by exerting a force on the backing plate 130. In one embodiment, the trip point may be set at 1 Torr to $1 \times 10^{-7}$ Torr. However, various different gap distances d may be selected to set the backing plate 130 a predetermined distance from the diaphragm 120.

Figure 3A:
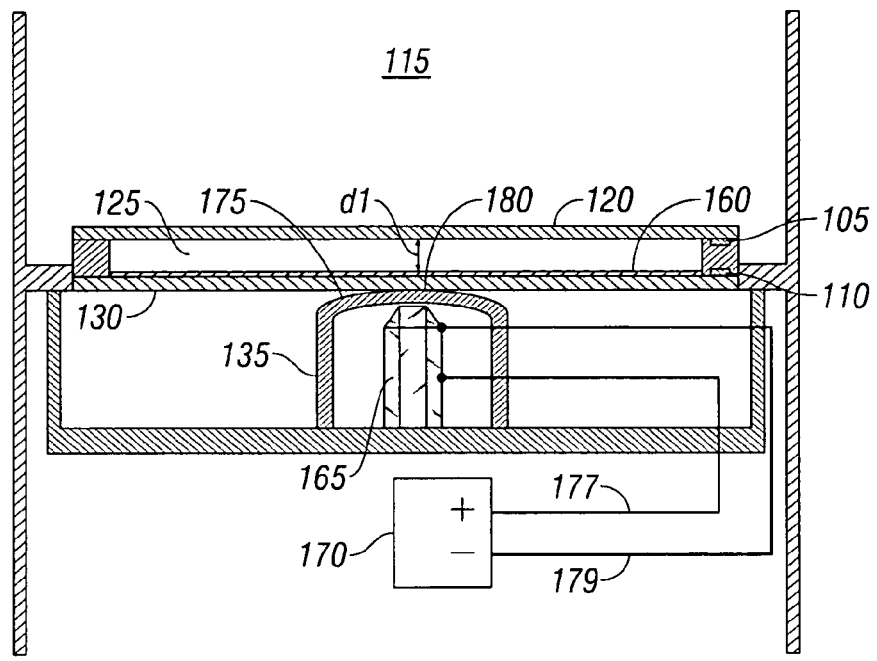
FIG. 3A is a cross sectional view of the pressure actuated switch showing operation of a piezoelectric actuator.
Figure 3B:
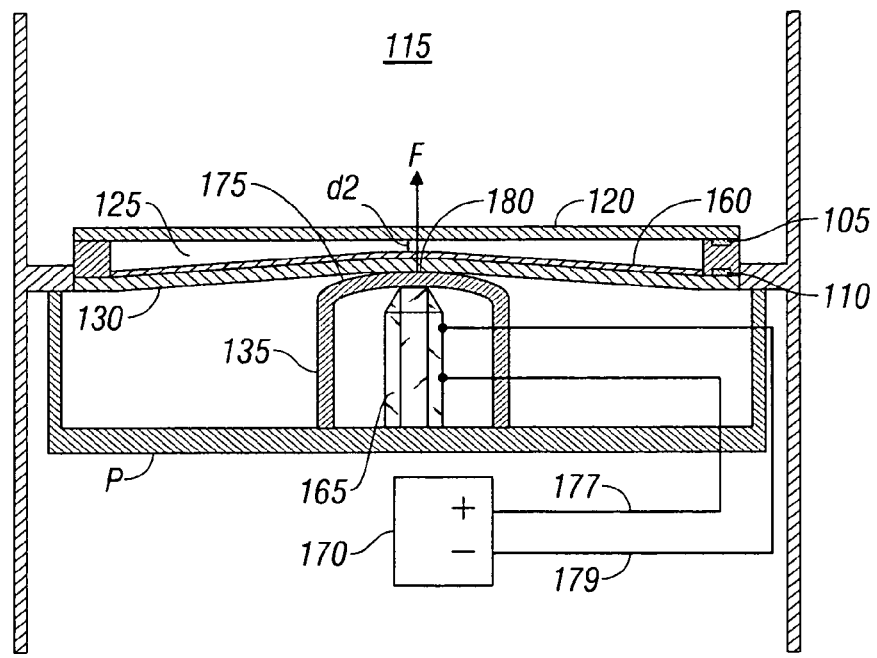
FIG. 3B is another cross sectional view of the pressure actuated switch showing operation of a piezoelectric actuator to set a predetermined gap distance between the diaphragm and the backing plate having the conductive film.

Referring now to FIGS. 3A and 3B, there is shown an interior of the piezoelectric actuator 135 in a simplified cross sectional view. The piezoelectric actuator 135 includes a piezoelectric crystal 165 that is coupled to a voltage source 170. However, it should be appreciated that this arrangement is not limiting. Moreover, the piezoelectric actuator 135 may include a ceramic or non-crystalline material. Various configurations are possible and within the scope of the present disclosure and the representation of FIGS. 3A and 3B is only illustrative.

As a predetermined voltage is applied to the piezoelectric actuator 135, the piezoelectric crystal 165 will increase its length by an amount $\Delta d$ and displace the actuator housing 175 relative to the base plate P by the amount $\Delta d$. This displacement or contact moves the backing plate 130 toward the diaphragm 120 by the amount $\Delta d$, with the displacement $\Delta d$ being proportional to the amount of voltage that is applied to the piezoelectric crystal 165 from source 170. Preferably, the amount of movement is in the range of about 0 to 3 micrometers. As shown in FIG. 3A, the piezoelectric actuator 135 may receive voltage along leads 177 and 179 to cause the displacement of the backing plate 130. The backing plate 130 preferably is disposed in a centermost point 180 of the backing plate 130 as shown in FIG. 3A.

In this manner, the pressure actuated switch 100 may be set to trip at a desired applied pressure in the region 115 such as $1 \times 10^{-3}$ Torr by varying the predetermined gap distance d by 0 to 3 micrometers as shown in FIG. 3B. Thus, using a controller (not shown), a predetermined amount of voltage will be supplied to the piezoelectric actuator 135. The piezoelectric actuator 135 will then electronically impart a displacement $\Delta d$ to the backing plate 130 in the direction shown. In this way, the gap distance d between the backing plate 130 having the conductive film 160 and the electrically conductive diaphragm 120 can be controlled via an electrical signal to the actuator 135 and thus the trip point of the switch 100 can be controlled.

In operation and as shown in FIG. 2B, when the pressure in region 115 is sufficiently great, the force of the gas on the diaphragm 120 will deform the diaphragm 120 enough so it contacts the surface 160 on the backing plate 130. This contact produces a signal indicating that the applied pressure F is greater than or equal to the largest trip point pressure corresponding to no applied voltage to the piezoelectric actuator 135. If the backing place 130 surface has been pushed away from the support plate P, the pressure on the diaphragm 120 needed to make the diaphragm 120 touch the conductive surface 160 of the backing plate 130 would be less than the largest trip point pressure. As the diaphragm 120 contacts the backing plate 130 as shown in FIG. 2B, the first electrical contact 120 will communicate with the second electrical contact 130 and thus generate a signal that the applied pressure is greater than the set trip point. This signal, as mentioned, preferably is a low current signal so as to not damage any components of the pressure actuated switch 100 for repeatability. The signal may be communicated to an amplifier (not shown) that is configured to amplify the signal to a controller or indicator (not shown).

Figure 4:
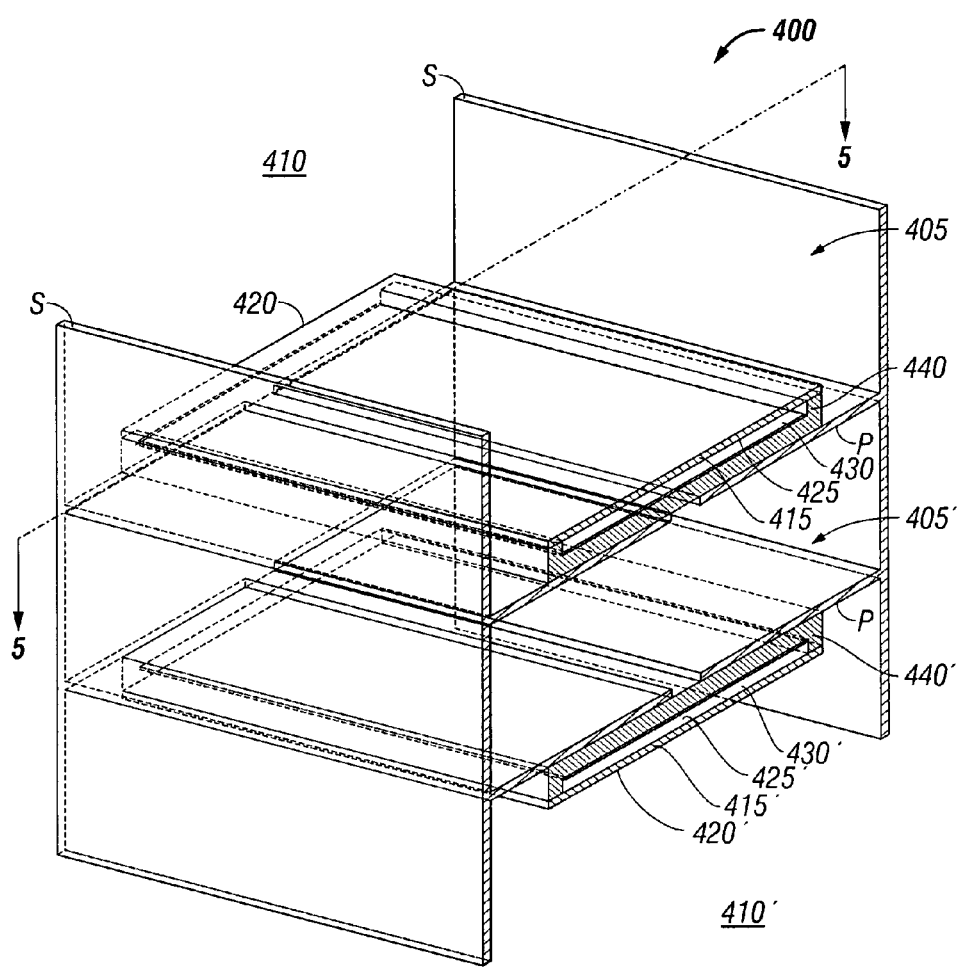
FIG. 4 is a perspective view of another embodiment of the switch of FIG. 1A including multiple capacitance diaphragm pressure sensors.
Figure 5:
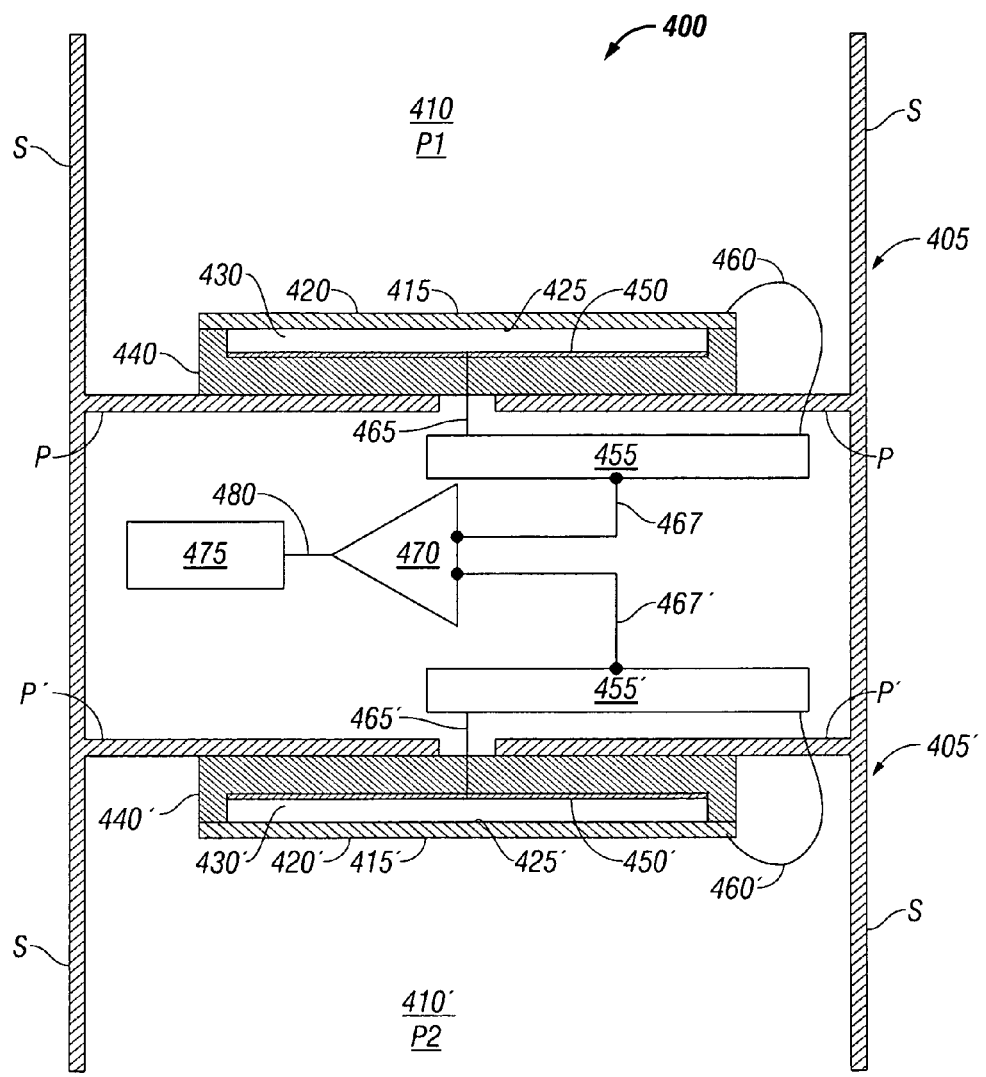
FIG. 5 is a cross sectional view of the multiple capacitance diaphragm pressure sensors of FIG. 4 along line 5-5 of FIG. 4.

Turning now to FIGS. 4 and 5, there is shown an alternative embodiment of the present invention to achieve differential pressure measurement. FIG. 4 shows an arrangement for a high vacuum region with a pressure actuated switch 400 being adapted to be compact and detect a pressure reading as small as $1 \times 10^{-7}$ Torr in differential pressure. As shown in FIGS. 4 through 5, the pressure actuated switch 400 includes two pressure sensor assemblies or a first pressure sensor assembly 405 and a second pressure assembly 405'. The first pressure sensor assembly 405 is disposed in contact with a first region 410 while the second pressure sensor assembly 405' is disposed in contact with a second region 410'. The first region 410 may have a different pressure than the second region 410' or may have the same pressure as the second region 410'. Various configurations are possible and within the scope of the present disclosure and the first pressure sensor assembly 405 and/or the second pressure sensor assembly 405' may be configured to be disposed in the same or different temperature controlled environments.

The first pressure sensor assembly 405 includes a diaphragm 415 that has a first face 420 that is in contact with first region 410 and a second face 425 that is in contact with a permanently evacuated cavity 430. The first permanently evacuated cavity 430 preferably is in a ring housing 440 that is arranged between the diaphragm 415 and a backing plate P of the first pressure sensor assembly 405. It should be appreciated that the diaphragm 415, and 415' are generally circular and merely shown in a cut away or sectioned view. In another embodiment, the diaphragms 415, 415' are elastic and include various shapes.

The second pressure sensor assembly 405' also includes a second diaphragm 415'. The second diaphragm 415' has a first face 420'. The first face 420' contacts a second region 410'. Another opposite second face 425' of the second diaphragm 415' contacts a second permanently evacuated cavity 430'. Turning now to FIG. 5, there is shown a cross sectional view of the differential pressure sensor 400 of FIG. 4. In one embodiment, the diaphragms 415 and 415' may be single crystal silicon, doped with a material to make them electrically conductive; however the diaphragm 415 and 415' may be arranged of similar materials as discussed above with the previous embodiments. The second permanently evacuated cavity 430' preferably is in the ring shaped housing 440' that is arranged between the diaphragm 415' and backing plate P' of the second pressure sensor assembly 405'.

The first pressure sensor assembly 405 also includes a reference electrode 450 isolated from region 410 in the evacuated cavity 430. The second pressure sensor assembly 405' likewise includes a second reference electrode 450'. The first diaphragm 415 is electrically conductive and the second diaphragm 415' is also electrically conductive while the ring shaped housings 440 and 440' are electrically non-conductive.

It should be appreciated that the first pressure sensor assembly 405 and the second pressure sensor assembly 405' may use various techniques to determine the pressure difference between regions 410 and 410' from the corresponding difference between the diaphragm-to-reference electrode capacitance in assembly 405 and the diaphragm-to-reference electrode capacitance in assembly 405'. The capacitance measurement technique may involve repetitively charging an unknown capacitor and then discharging it into a known capacitor, and developing a corresponding signal voltage therefrom. Various configurations are possible and within the scope of the present disclosure.

The first pressure sensor assembly 405 also includes a capacitance-to-voltage converter 455 that is coupled to the first diaphragm 415 by a lead 460. Likewise, the second pressure sensor assembly 405' also includes a capacitance-to-voltage converter 455' that is coupled to the second diaphragm 415' by a lead 460'. The capacitance-to-voltage converter 455 is also coupled to the reference electrode 450 along lead 465. The second capacitance-to-voltage converter 455' is also coupled to the reference electrode 450' along lead 465'. Output voltage from each of the capacitance-to-voltage converters 455, 455' is coupled to a differential amplifier 470 by leads 467, 467'. The output signal from the amplifier 470 is coupled along lead 480 to a logic unit 475 which may be a digital signal controller or analog control circuit. The logic unit 475 preferably has program instructions to determine the pressure difference between regions 410, 410' from the signal difference developed at lead 480 from the signal inputs at leads 467 and 467'. The logic unit 475 determines a pressure differential signal, which can be analog, digital, or both. The signal may be communicated to another process controller (not shown) or an indicator (not shown) to determine the pressure difference (P1-P2), between regions 410, 410'.

The applied pressure $P_1$ is applied to the first face 420 of the first diaphragm 415 from the first region 410. In response to the applied pressure $P_1$, a capacitance of the diaphragm 415 increases relative to the value it has at $P_1=0$. An applied pressure $P_2$ is also applied to the first face 420' of the second diaphragm 415' from the second region 410'. A capacitance of the second diaphragm 415' will also increase in response to the applied pressure $P_2$, relative to the value it has at $P_2=0$.

The amplified difference of the signals on leads 467 and 467' is output at element 480 from the difference amplifier 470 and communicated to logic unit 475. Logic unit 475 may convert the amplified voltage difference at 480 into a corresponding value of the pressure difference ($P_1$-$P_2$), between regions 410 and 410'. For improved accuracy of the differential pressure measurement, logic unit 475 may also be configured so that an offset correction can be made to account for a non-zero output at lead 480 when the differential pressure is zero. It should be appreciated that the assemblies 405, and 405' determine a pressure difference from the signal difference between two independent capacitance diaphragm pressure sensors.

In an alternative embodiment of the present disclosure, the first and the second diaphragms may further include a coating (not show) disposed on the respective first face 420, 420' of the diaphragms 415, 415'. The coating may be configured to protect the faces 420, 420' from corrosive gases present in regions 410, 410'.

Figure 6:
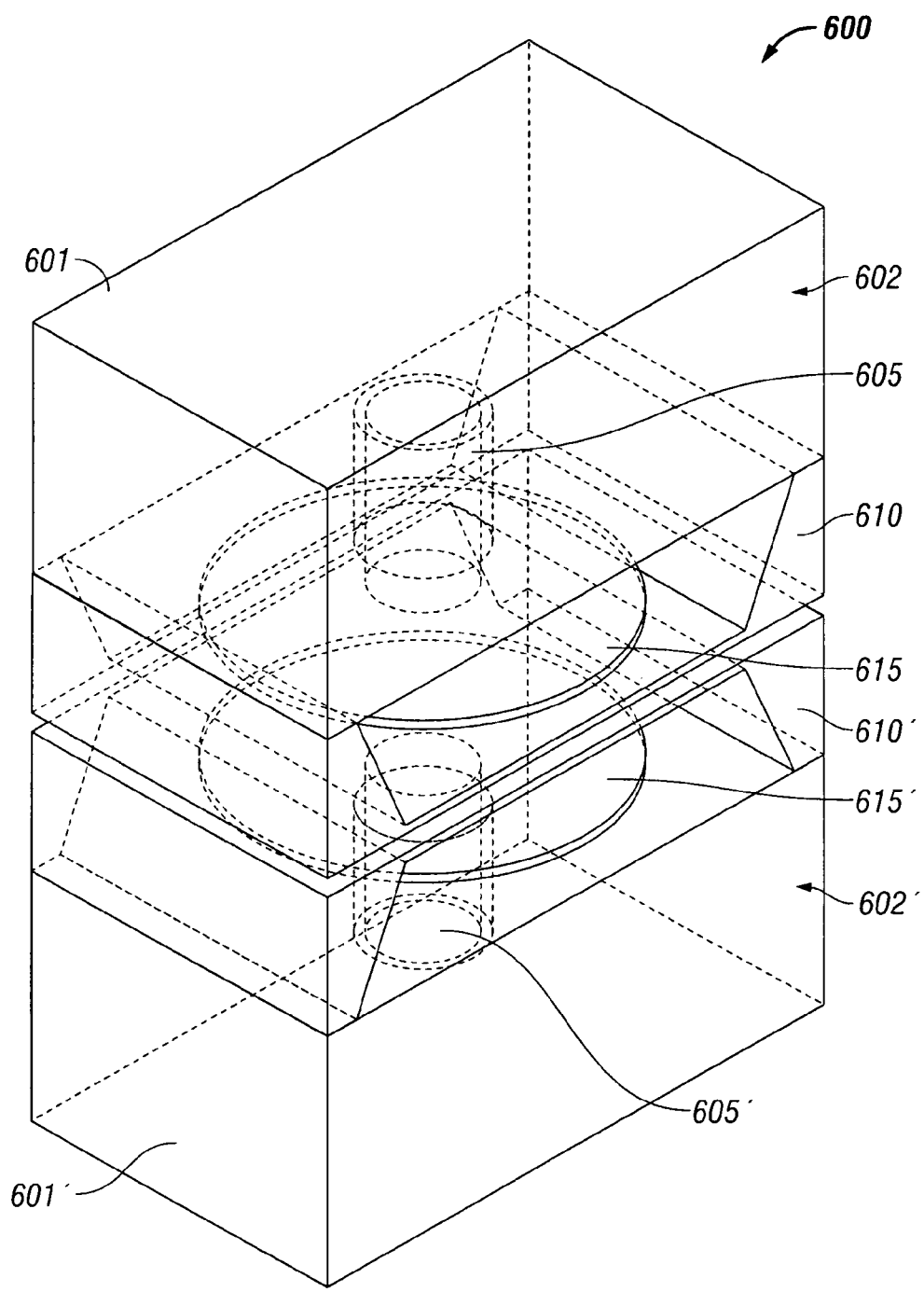
FIG. 6 is a perspective view of another embodiment of the switch of FIG. 4 including multiple adjustable pressure actuated switches disposed in a parallel configuration.
Figure 7:
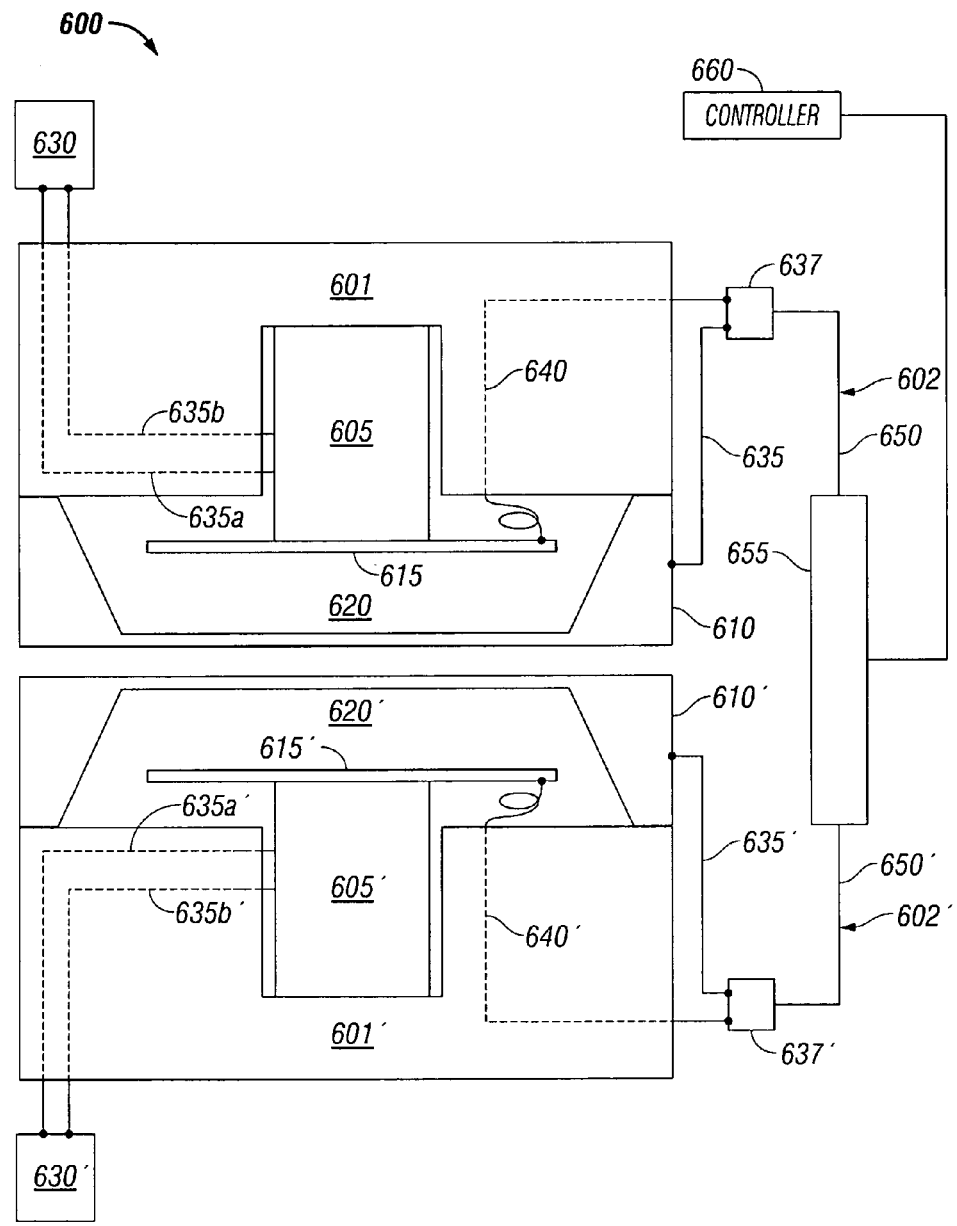
FIG. 7 is a cross sectional view of the multiple pressure actuated switches of FIG. 6.

Turning now to FIGS. 6 and 7, there is shown another alternative embodiment of the present disclosure. In this embodiment, the pressure actuated switch 600 includes plural pressure sensing assemblies 602, 602' with each having a piezoelectric actuator 605, 605' that can adjust a trip set point of the respective pressure sensing assembly 602, 602' as discussed with regard to the embodiment of FIG. 1. The first pressure sensor assembly 602 includes a first diaphragm 610, a moveable conductive surface 615 connected to the piezoelectric actuator 605, and an evacuated cavity 620 (FIG. 7). The second pressure sensor assembly 602' includes a second diaphragm 610', a second moveable conductive surface 615', and a second evacuated cavity 620' (FIG. 7). It should be appreciated that FIG. 6 merely is showing a sectioned view of diaphragms 610, and 610', and diaphragms are generally circular shaped, however may be made in any desired shape known in the art. Each diaphragm 610, 610' is connected to a respective substrate 601, 601' as discussed previously and the assemblies 602, 602' are shown as slightly separated from one another, however it should be appreciated that they may be placed a far distance apart, and the distance shown is only for illustration purposes.

Turning now to FIG. 7, there is shown a cross sectional view of the pressure sensor of FIG. 6. The second pressure sensing assembly 602' includes a second diaphragm 610', a second moveable conductive surface 615' and a second evacuated cavity 620' similarly fashioned with respect to the embodiment of FIG. 1. Each of the pressure sensing assemblies 602, 602' includes a voltage or signal source 630, 630'. Each source 630, 630' is connected to the respective piezoelectric assembly 605, 605' by leads 635a, 635b, 635a' and 635b' to adjust a trip point of the respective first and second pressure sensing assembly 602, 602'. The gap distance between surface 615 and surface 610 and between surfaces 615' and 610' can each be independently set at any value in the range of 0 to $d_o$, where $d_o$ is the maximum gap distance corresponding to the case in which the control voltage applied to the actuators 605, and 605' is zero. In this way, the trip point pressure for each switch 601, 601' can be independently set at any fraction of the pressure value corresponding to the maximum diaphragm deflection $d_o$ for the particular diaphragm in use. First pressure sensing assembly 602 may have the same or a different pressure trip point than the second pressure sensing assembly 602'.

In operation, when a pressure $P_1$ is applied to the first diaphragm 610 that exceeds the set point applied by the first piezoelectric actuator 605, the first diaphragm 610 deflects and contacts the first conductive surface 615. The first pressure sensing assembly 602 further has a first electrical lead 635 and a second electrical lead 640. The first electrical lead 635 is connected to the first diaphragm 610 and the second electrical lead 640 is connected to the first conductive surface 615. When the first diaphragm 610 deflects and contacts the conductive surface 615, the diaphragm acts as a conductor and communicates with conductive surface 615. At this point, a signal is communicated along lead 650 to the amplifier 655. The amplifier 655 may further communicate the signal to the logic unit 660.

Turning now to the second pressure sensing assembly 602', when an applied pressure $P_2$ is applied to the second diaphragm 610' that exceeds the set point determined by the second piezoelectric actuator 605', the second diaphragm 610' deflects and contacts the second conductive surface 615'. The second pressure sensing assembly 602' likewise includes a third electrical lead 635' and a fourth electrical lead 640' with the fourth electrical lead 640' connected to moveable second conductive surface 615' and the third electrical lead 635' connected to second diaphragm 610'.

The comparator circuit 655 has two inputs, $I_1$ at 650 and $I_2$ at 650'. One input is from a first switch state detector 637 and the other one is from a second switch state detector 637'. The output from the comparator 655 has four possible values, determined by the four possible pairs of input values to it. The first input $I_1$ and the second input $I_2$ may be the same value (X and X) with corresponding output value A from comparator 655. The first input $I_1$ and the second input $I_2$ may be different values (X and Y) with corresponding output value B from comparator 655. The first input $I_1$ and the second input $I_2$ may be different values (Y and X) with corresponding output value C from comparator 655. The first input $I_1$ and the second input $I_2$ may be the same values (Y and Y) but different than the value above for value A and then output value D from comparator 655. The correspondence between X and Y values of the switch state detectors 637 and 637' can be the following conditions: if $P_1$ is less than the trip point pressure of region 601, then value X is output from switch state detector 637. If $P_1$ is greater than or equal to the trip point pressure of region 601, then value Y is output from switch state detector 637. If $P_2$ is less than the trip point pressure of region 601', then value X is output from switch state detector 637'. If $P_2$ is greater than or equal to the trip point pressure of region 601', then value Y is output from switch state detector 637'.

The logic unit 660 of FIG. 7 can be configured so that the action it takes is determined by which input (A, B, C, or D) the logic unit 660 receives from comparator 655.

In one embodiment, the first pressure switching assembly 602 may communicate with a reference pressure in one region while the second pressure sensing assembly 602' may be exposed to a high vacuum region in a different region for switching at a predetermined trip point. In another embodiment, the second pressure switching assembly 602' may communicate with the reference pressure in a first region while the first pressure switching assembly 602 may communicate with a high vacuum or ultra high vacuum region in second different region for switching at the predetermined trip point.

In yet another further embodiment, the first pressure switching assembly 602 may communicate with a first predetermined vacuum region pressure while the second pressure switching assembly 602' may act as a redundant second pressure switching assembly that is also exposed to the same region. In a further embodiment, the pressure actuated switching assembly 600 may have the assemblies exposed to the same region and switch at plural different trip or switch points such as $1\times10^{-3}$ Torr and $1\times10^{-4}$ Torr and/or provide indicators of different pressure set points. In another embodiment, the first assembly 602 may only operate after the second assembly 602' sequentially actuates or switches on. Various different embodiments are possible and within the scope of the present disclosure.

Figure 8:
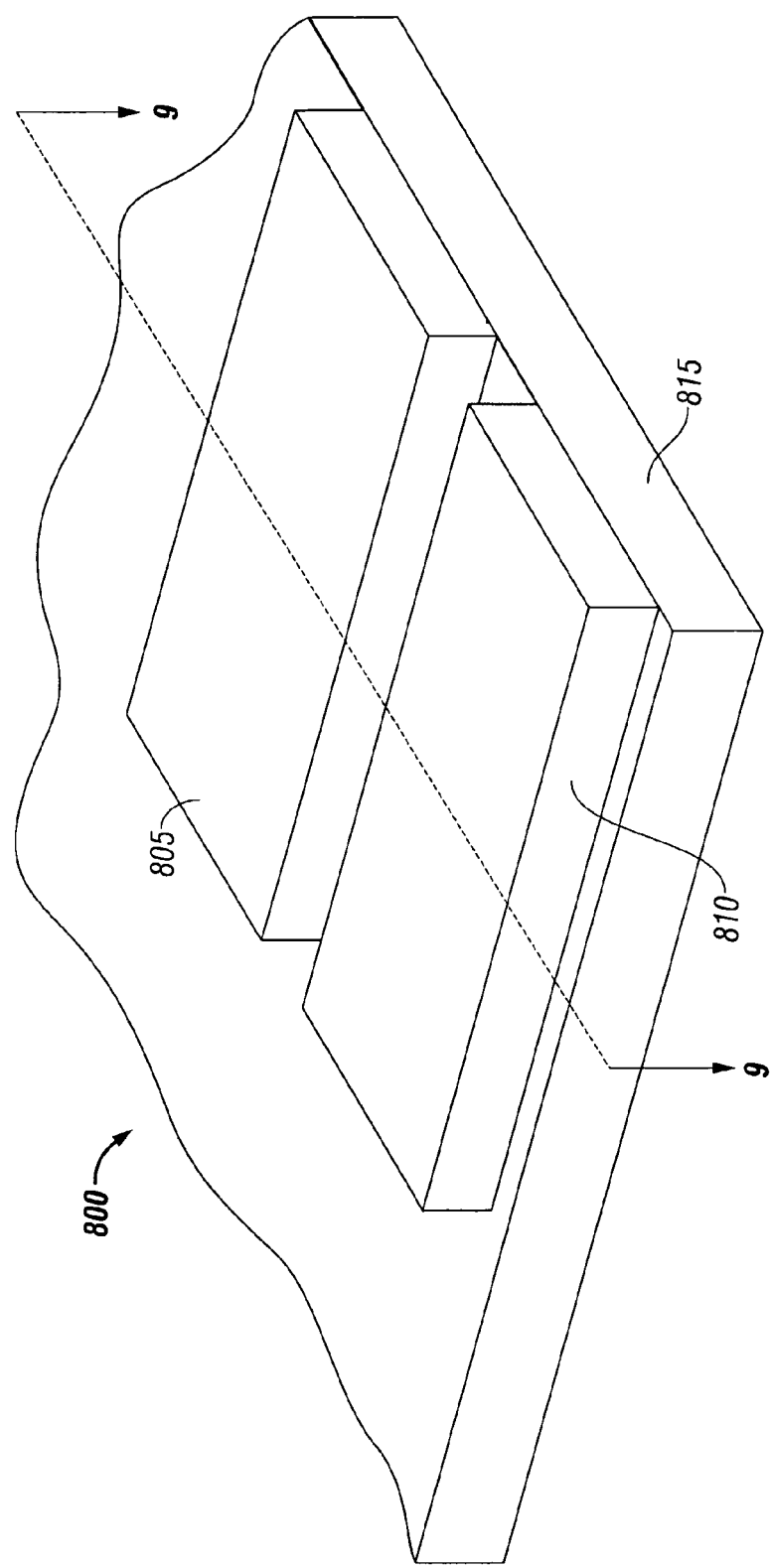
FIG. 8 is a perspective sectioned view of yet another embodiment including multiple capacitance diaphragm pressure sensors disposed on a single substrate connected to an application specific integrated circuit.
Figure 10:
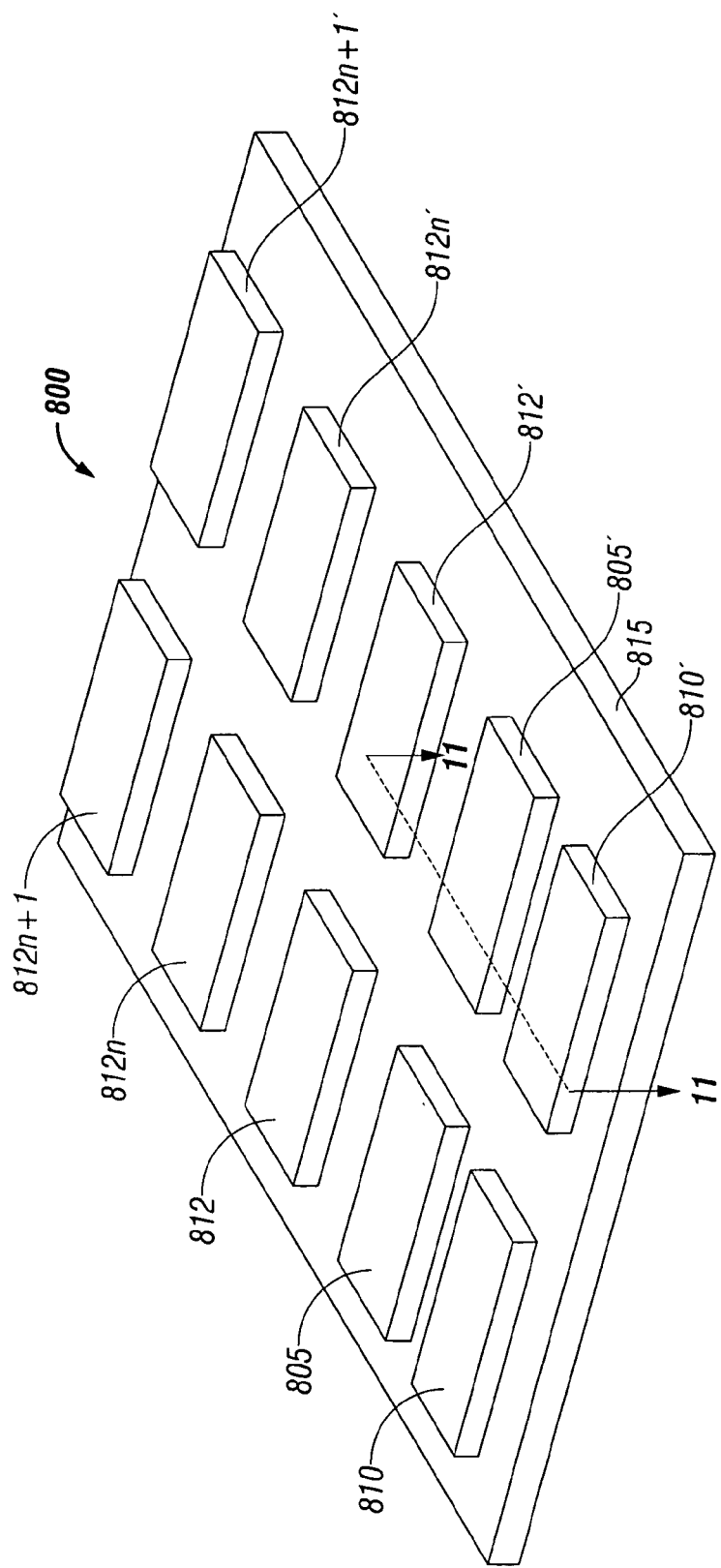
FIG. 10 is a perspective view of multiple capacitance diaphragm pressure sensors disposed in an array on the substrate.

Turning now to FIG. 8, there is shown a perspective view of a pressure actuated switch 800. The pressure actuated switch 800 is shown as part of a sectional view of a larger substrate 815. The pressure actuated switch 800 may be fabricated as one or multiple pressure sensing assemblies 805, 812, 812n disposed on the substrate 815 as shown in FIG. 10. The multiple pressure sensing assemblies of the switch 800 of the FIG. 8 embodiment may provide a pressure sensing range that is wider than what can be achieved with a single diaphragm.

Figure 9A:
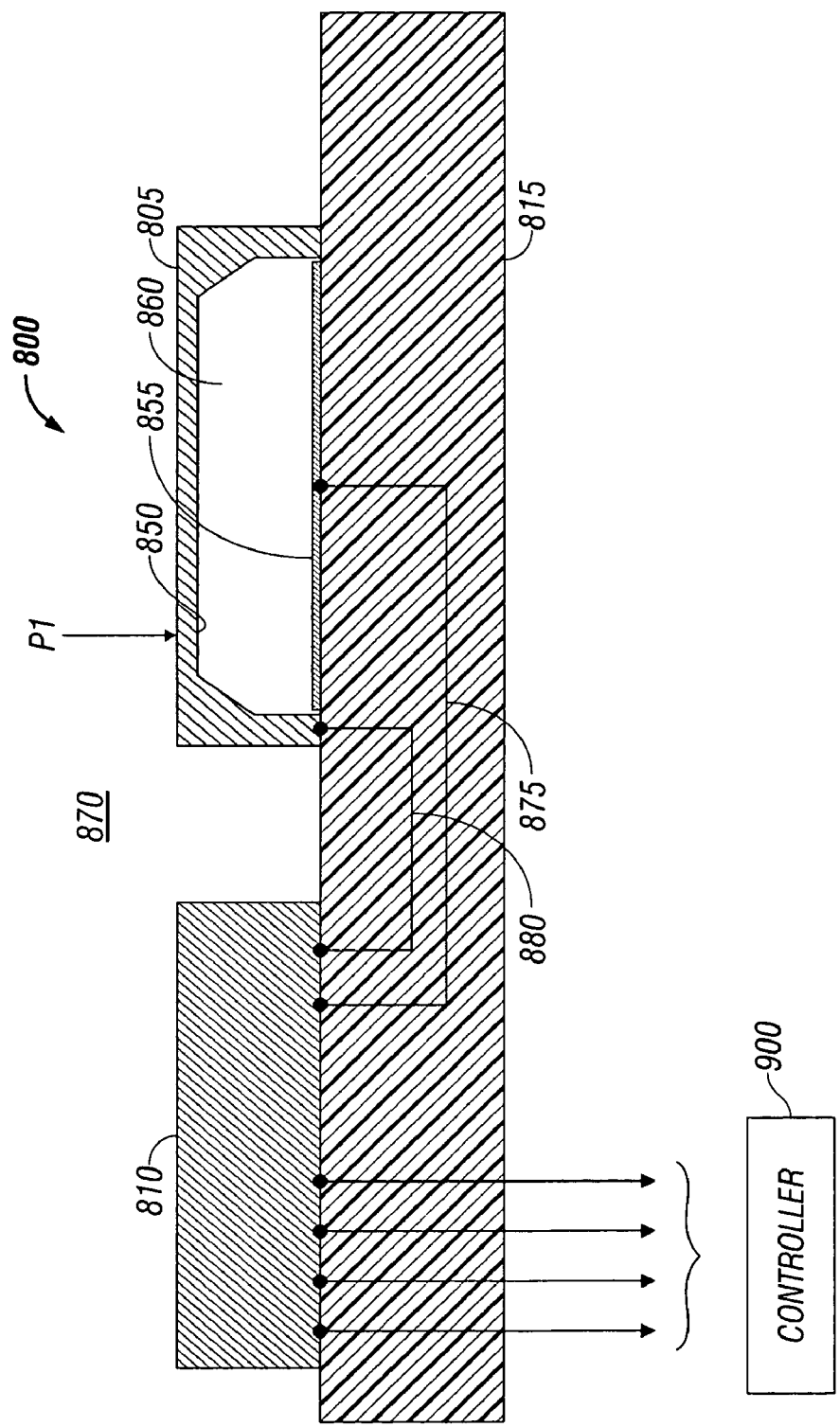
FIG. 9A is a cross sectional view of a diaphragm pressure sensor disposed on a substrate connected to the application specific integrated circuit of FIG. 8 along line 9-9 of FIG. 8.

By use of MEMS fabrication processes for the pressure sensing components of assemblies 805, 812, 812n, the overall size of the assembly 800 may be arranged in a configuration that is small. The pressure actuated switch 800 of the present disclosure includes multiple pressure sensing assemblies 805, 812, 812n that provide for a wide pressure range relative to single diaphragm. The pressure actuated switch 800 includes an advantageous detection range collectively as little as $1\times10^{-7}$ Torr, while at the same time provides for gas species independent pressure sensing. In the embodiment of FIG. 8, the first assembly 805 is disposed adjacent to an integrated circuit 810 that may conveniently receive input signals from the first assembly 805. The integrated circuit 810 can perform various signal processing functions based on the input, and output a signal based on this processing. It should be understood that the pressure sensing assemblies 805, 812, 812n may be either diaphragm pressure switches (for example, as shown in FIG. 1A, or capacitance diaphragm pressure sensors as shown in FIG. 9A). In the case in which assemblies 805, 812, 812n are capacitance diaphragm pressure sensors, switching actions with an adjustable switch point can be realized electronically in the signal processing unit 810.

Turning now to FIG. 9A, there is shown a cross sectional view of the pressure actuated switch 800 along line 9-9 of FIG. 8 showing one of the multiple pressure sensing assemblies 805, 812, 812n shown in FIG. 10. Each of the multiple pressure sensing assembles 805, 812, 812n may communicate with the integrated circuit 810. As shown, the pressure sensor assembly 805 is a capacitance sensor that operates by measuring a change in electrical capacitance that results from the movement of a sensing diaphragm 850 relative to a fixed capacitance electrode 855 that is isolated from region 870 in a permanently evacuated reference cavity 860. The higher or lower the process vacuum of the region 870 as shown by the applied pressure reference arrow $P_1$, the electrically conductive diaphragm 805 will deform in response to the applied pressure, resulting in a change in the capacitance between diaphragm 850 and the fixed reference electrode 855, which is isolated in the evacuated reference cavity 860. The signal processing unit 810 is configured to measure changes in the diaphragm-to-reference electrode capacitance. As shown in FIG. 9A, the reference electrode 855 is disposed on the substrate 815 and is connected to an application specific integrated circuit 810 by internal lead 875. The diaphragm 850 is also connected to the integrated circuit 810 by internal lead 880. It should be appreciated that the internal leads 875, 880 are isolated from the region 870. Integrated circuit 810 may further be coupled to a controller 900 to output signals from the controller 900.

Again, it should be appreciated that the pressure sensor assembly 805 disposed on the substrate 815 is fabricated with Micro-Electro-Mechanical Systems components some of which have a size that is in a range of several micrometers, and even 1/10 the size of conventional metallic or ceramic diaphragms.

Figure 9B:
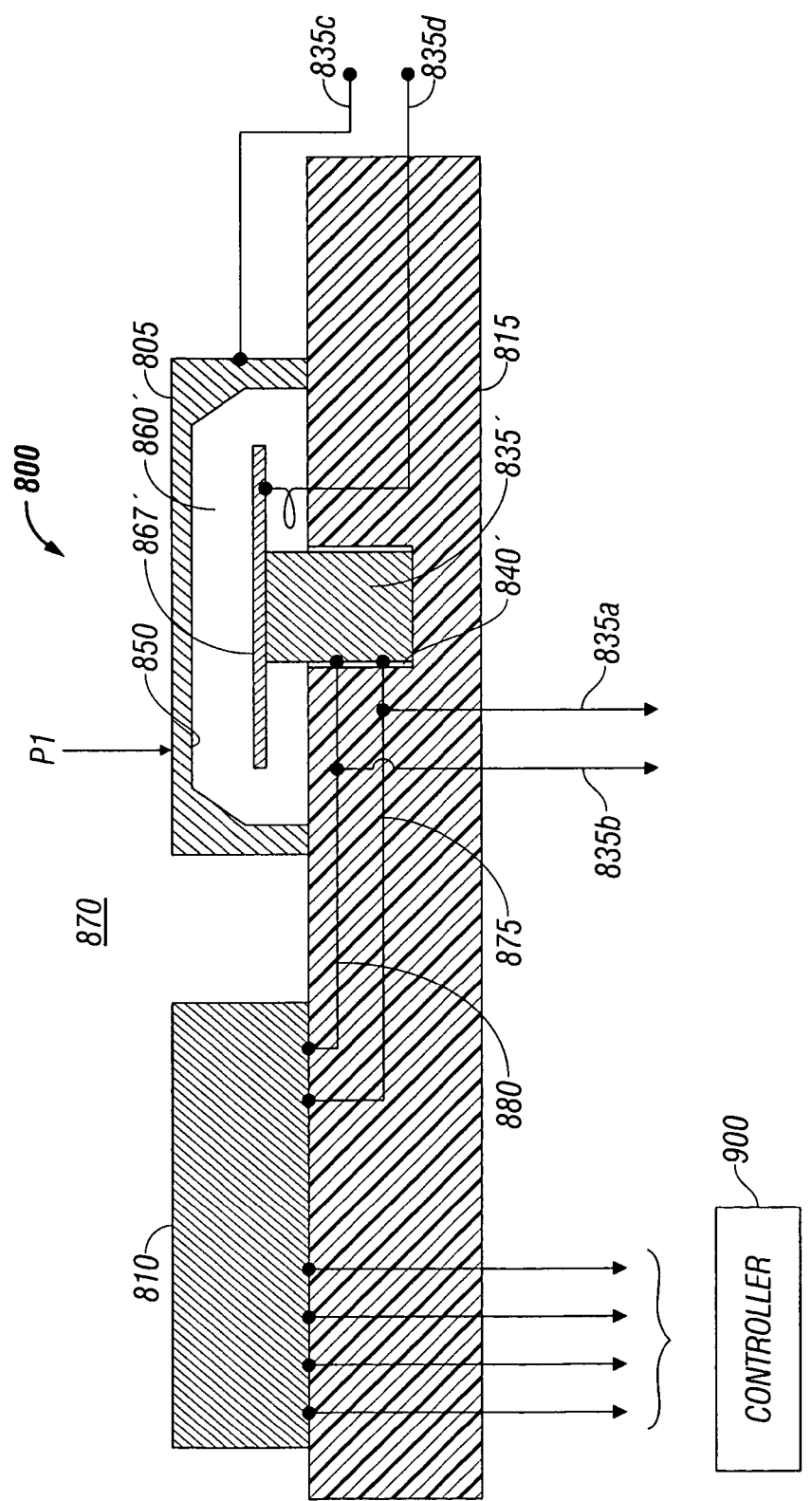
FIG. 9B is a cross sectional view of another embodiment of a diaphragm pressure sensor with a piezoelectric assembly on a substrate and connected to the application specific integrated circuit of FIG. 8.

Turning now to FIG. 9B, the pressure sensor 800 may alternatively include a piezoelectric assembly 835' similar to the previously described embodiment of FIG. 1A disposed through a notch 840'. The sensor 800 may also include a moveable conductive surface 867' that is connected to the piezoelectric assembly 835' similar to the embodiment of FIG. 1A. In this embodiment, the diaphragm 805 may contact the conductive surface 867' across the evacuated cavity 860'. Similarly, the piezoelectric assembly 835' may receive an applied voltage along leads 875, 880 to electronically adjust a trip point of the sensor 800 by translating the surface 867' as discussed above so the sensor 800 is responsive to very minute changes in the region 870.

The diaphragm 850 may be connected to lead 835c and the moveable conductive surface 867' may be connected to lead 835d in a similar manner as discussed above to FIG. 1A to develop a signal. Additionally, the piezoelectric assembly 835' may be connected along leads 835a and 835b to the controller 900 to electronically set the trip point of the sensor 800 using the controller 900 instead of using the integrated circuit 810. Various configurations are possible and within the scope of the present disclosure.

Referring now to FIG. 10, plural sensing assemblies 805, 812, 812$_n$, and 812$_{n+1}$ may be disposed on the substrate 815 with each of the sensing assemblies including different capacitance gauge set trip points configured to detect small different pressure readings for increased redundancy. In this embodiment, the pressure actuated switch 800 may include a first pressure sensor assembly 805, a second pressure sensor 812, a third pressure sensor 812$_n$, and a fourth pressure sensor 812$_{n+1}$ with each being coupled to the integrated circuit 810 and disposed on a substrate 815 in a similar manner as described with FIG. 9A Likewise, there may be another array of pressure sensor assemblies disposed on the same substrate 815, such as a first pressure sensor 805', a second pressure sensor 812', a third pressure sensor 812'$_n$, and a fourth pressure sensor 812'$_{n+1}$ with each sensor coupled to the same or alternatively a different integrated circuit 810'. Each of the first through fourth pressure sensors 805, 812, 812$_n$, and 812$_{n+1}$ may be configured to be disposed on the substrate 815 and include a separate permanently evacuated cavity 860 with a reference electrode 855 disposed in the permanently evacuated cavity 860 similar to the embodiment shown in FIG. 9A. Moreover, each of the first through fourth pressure sensors 805, 812, 812$_n$, and 812$_{n+1}$ may be alternatively configured to share the same evacuated reference cavity that can be fabricated on the common substrate 815. In this embodiment, plural sensing assemblies 805, 812, 812$_n$, and 812$_{n+1}$ may be configured for a process chamber in a semiconductor industry application where chemical vapor deposition processing may take place.

In one embodiment, one pressure sensor assembly 805 may be configured to measure process gas pressure in a range of $1 \times 10^{-3}$ Torr while another pressure sensing assembly 812 may be configured to measure in the range of 1 Torr with the other assemblies 812$_n$, 812$_{n+1}$ being configured to trip or signal at other ranges.

Figure 11:
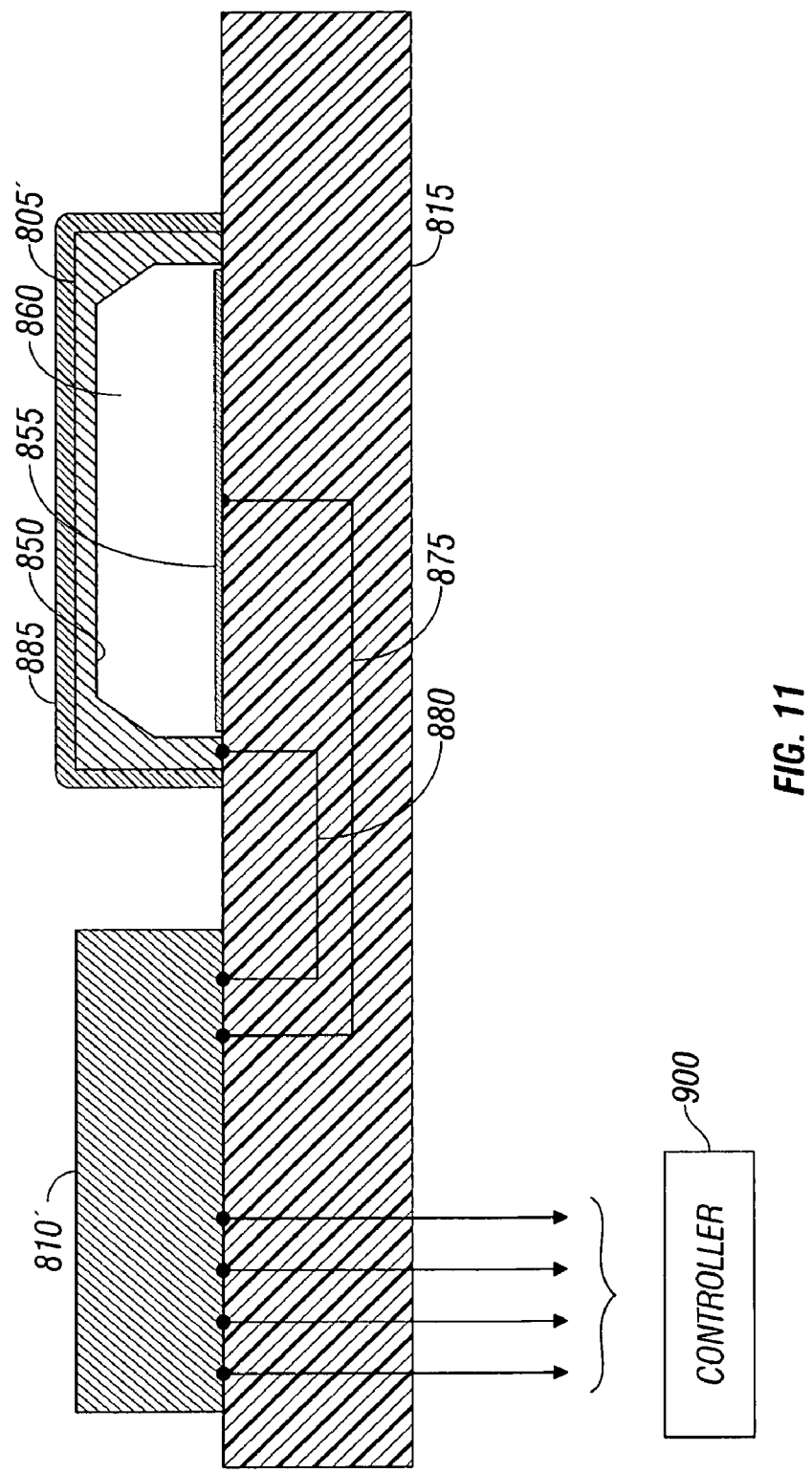
FIG. 11 is a cross sectional view of another embodiment of a diaphragm pressure sensor shown along line 11-11 of FIG. 10 with the diaphragm including a protective coating.

In this embodiment, shown in a cross sectional view as FIG. 11 along line 11-11 of FIG. 10, each of the diaphragms 850 may be disposed in a hostile working environment and exposed to corrosive gases that can impede the operation of the respective assembly 805'. In this hostile embodiment, the assembly 805' may be configured so as to include a coating 885 disposed thereon. In one embodiment, the coating 885 may substantially surround the diaphragm 850 or only a portion thereof to protect the diaphragm 850, but not impede operation of the diaphragm 850. In one non-limiting embodiment, the coating 885 may completely cover the diaphragm 850 with the coating 885 being a silicon carbide coating that is configured to protect diaphragm 850. Likewise, other diaphragms (not shown) may have the same or different coatings. In another embodiment, the coating 885 may cover only a portion of the diaphragm 850. Various configurations are possible and within the scope of the present disclosure.

While this invention has been particularly shown and described with references to preferred embodiments thereof, it will be understood by those skilled in the art that various changes in form and details may be made therein without departing from the scope of the invention encompassed by the appended claims.

What is claimed is:

1. A pressure actuated switch for a pressure region that can be operable over a range of pressures comprising:
    a diaphragm including a first electrically conductive surface;
    a second conductive surface electrically isolated from the first conductive surface and having an evacuated cavity disposed between the first conductive surface and the second conductive surface;
    a piezoelectric assembly mechanically coupled to the second conductive surface;
    a controller applying a control signal to the piezoelectric assembly, the piezoelectric assembly in response to the control signal shifting a location of second conductive surface to set a trip point of the switch; and
    the diaphragm being exposed to the region and in response to pressure causing the first conductive surface to deflect in a direction toward the second conductive surface, the first conductive surface communicating with the second conductive surface to produce a signal.

2. The pressure actuated switch of claim 1, wherein the diaphragm is doped with a second material to make the diaphragm electrically conductive.

3. The pressure actuated switch of claim 1, wherein the diaphragm comprises a single crystal silicon diaphragm.

4. The pressure actuated switch of claim 1, wherein the diaphragm comprises an elastic material.

5. The pressure actuated switch of claim 1, wherein the diaphragm is a micro-electro-mechanical system fabricated as a boron doped single crystal silicon diaphragm.

6. The pressure actuated switch of claim 1, wherein the evacuated cavity disposed between the first conductive surface and the second conductive surface includes a gap distance of about three micrometers.

7. The pressure actuated switch of claim 1, wherein the diaphragm and backing plate are micro-electro-mechanical system components.

8. The pressure actuated switch of claim 1, further comprising an electrode, the electrode being connected to the second conductive surface.

9. The pressure actuated switch of claim 1, wherein the diaphragm has a thickness of about three micrometers.

10. The pressure actuated switch of claim 1, wherein the first conductive surface contacts the second conductive surface at a predetermined pressure by deforming elastically in response to the predetermined pressure.

11. The pressure actuated switch of claim 10, wherein the predetermined pressure is in a range between about 1 Torr to about $1 \times 10^{-7}$ Torr.

12. The pressure actuated switch of claim 1, further comprising an amplifier configured to amplify the signal.

13. The pressure actuated switch of claim 1, further comprising a coating disposed on the diaphragm to protect the diagram.

14. The pressure actuated switch of claim 1, wherein the second conductive surface comprises a conductive film, and wherein the controller applies the control signal to the piezoelectric assembly to translate the conductive film toward the first conductive surface, the translation setting a gap therebetween and being proportional to the control signal to configure the trip point of the switch.

15. A pressure actuated switch for a process control region comprising:
 a boron doped single crystal silicon diaphragm including a first electrically conductive surface, the diaphragm being exposed to an applied pressure in the process control region;
 a second conductive surface electrically isolated from the first conductive surface and having an evacuated cavity disposed between the first conductive surface and the second conductive surface;
 a piezoelectric assembly mechanically coupled to the second conductive surface, the piezoelectric assembly being coupled to an controller and configured to selectively adjust a trip point of the pressure actuated switch by moving the second conductive surface toward the first conductive surface; and
 the controller applying a control signal to the piezoelectric assembly, the piezoelectric assembly in response to the control signal shifting the second conductive surface to set the trip point, the first conductive surface deflecting in a direction toward the second conductive surface in response to the applied pressure, the first conductive surface communicating with the second conductive surface in response to the applied pressure to produce a signal, the trip point being settable in a range that includes 100 Torr to $1 \times 10^{-7}$ Torr.

16. The pressure actuated switch of claim 15, wherein the diaphragm is coated on a surface in contact with gas to protect the diaphragm.

17. The pressure actuated switch of claim 15, further comprising a substrate connected to the diaphragm to define the evacuated cavity therebetween, and wherein the piezoelectric assembly increases in length when a voltage is applied to the piezoelectric assembly, the increase translating an electrode connected to the second conductive surface in the evacuated cavity.

18. The pressure actuated switch of claim 15, further comprising an amplifier configured to receive the signal.

19. The pressure actuated switch of claim 15, wherein the boron doped single crystal silicon diaphragm and second conductive surface are micro-electro-mechanical system components.

20. A pressure actuated switch for a process control comprising:
 a coated conductive diaphragm;
 a conductive surface electrically isolated from the coated conductive diaphragm and having an evacuated cavity disposed between the coated conductive diaphragm and the conductive surface;
 a piezoelectric assembly moving the conductive surface, the piezoelectric assembly being coupled to a controller and configured to selectively adjust a trip point of the pressure actuated switch; and
 the controller applying a control signal to the piezoelectric assembly, the piezoelectric assembly in response to the control signal moving the conductive surface to set the trip point, the coated conductive diaphragm deflecting in a direction toward the conductive surface in response to an applied pressure, the conductive diaphragm communicating with the conductive surface to produce a signal, the trip point being settable in a range that includes to 100 Torr to $1 \times 10^{-7}$ Torr.

21. A method for actuating a switch in response to an applied pressure, the method comprising:
 electrically setting a trip point of the switch by apply a signal to a piezoelectric actuator, the piezoelectric actuator configured to move the second conductive surface toward the first conductive diaphragm to adjust a predetermined gap between the first conductive diaphragm and the second conductive surface;
 applying a signal to the first conductive diaphragm;
 applying a signal to the second conductive surface;
 exposing the first conductive diaphragm to the applied pressure; and
 developing a signal when the applied pressure exceeds a predetermined pressure threshold, the predetermined pressure threshold being when the first conductive diaphragm contacts the second conductive surface.

* * * * *